Figure 1:
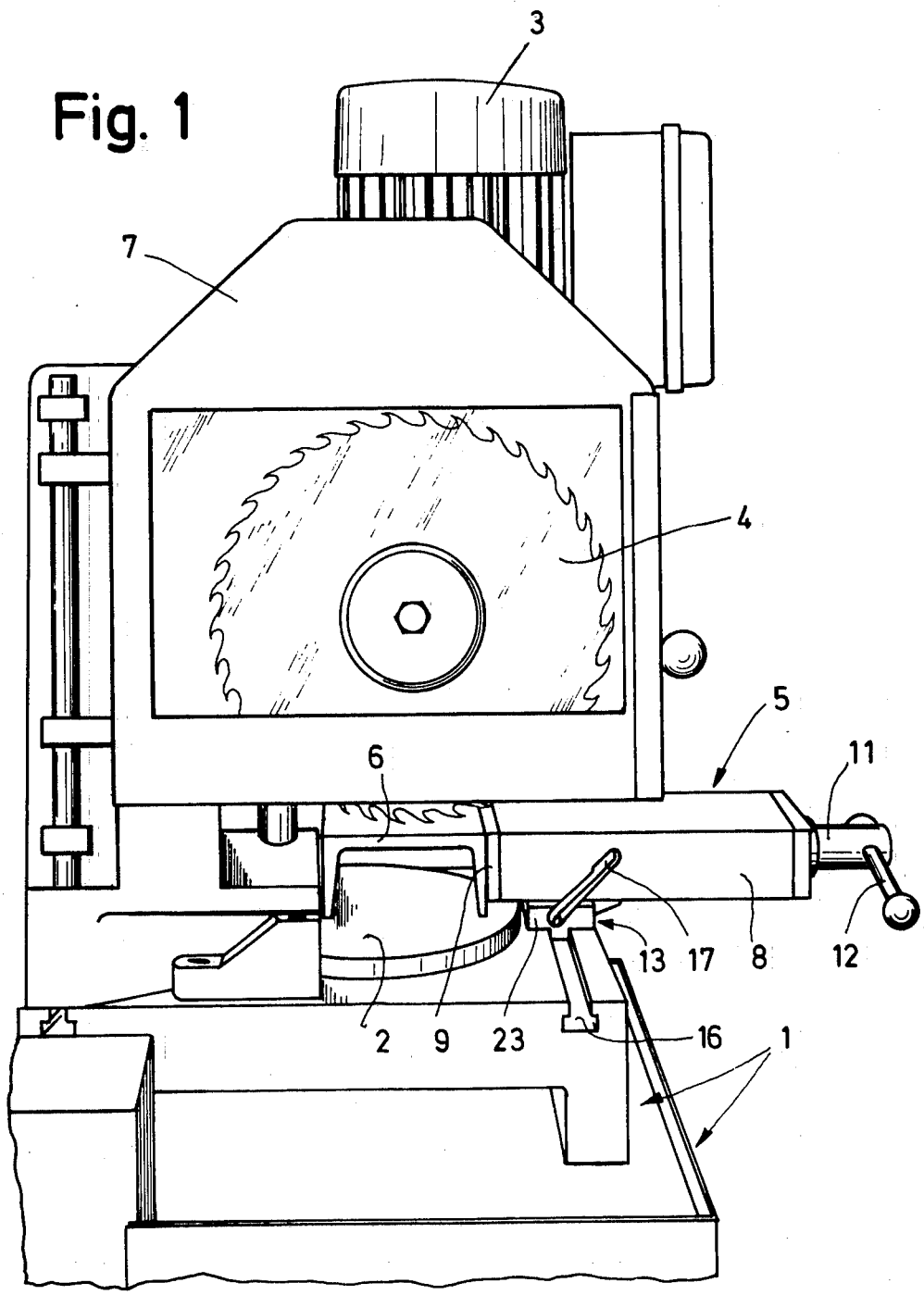

United States Patent [19]
Holder

[11] Patent Number: 4,576,075
[45] Date of Patent: Mar. 18, 1986

[54] CIRCULAR SAW MACHINE

[75] Inventor: Kurt Holder, Koengen, Fed. Rep. of Germany

[73] Assignee: Chr. Eisele Maschinenfabrik GmbH & Co. KG, Koengen, Fed. Rep. of Germany

[21] Appl. No.: 577,953

[22] Filed: Feb. 8, 1984

[30] Foreign Application Priority Data

Feb. 25, 1983 [DE] Fed. Rep. of Germany ....... 3306743

[51] Int. Cl.$^4$ .............................................. B26D 7/02
[52] U.S. Cl. .................................... 83/464; 83/471.3; 269/99
[58] Field of Search .............. 83/455, 464, 466, 471.2, 83/471.3, 491, 486; 269/99, 100, 236

[56] References Cited

U.S. PATENT DOCUMENTS 2,908,303 10/1959 Schmidt ......................... 269/236 X
3,672,251 6/1972 Jagers ........................... 83/471.2 X

FOREIGN PATENT DOCUMENTS 801486 1/1951 Fed. Rep. of Germany .

Primary Examiner—Douglas D. Watts
Attorney, Agent, or Firm—Neuman, Williams, Anderson & Olson

[57] ABSTRACT

The invention relates to a circular saw machine having a machine frame, a workpiece support, a rotatingly driven circular saw blade and a clamping device for clamping workpieces on the workpiece support; the clamping device is displaceable and clampable on the machine frame and relative to the circular saw blade in a groove and by means of a sliding member engaging in this groove. The sliding member is hereby designed to be clampable in the groove by means of an eccentric so that the clamping device of such a machine may be adjusted and locked in position in a simple manner.

2 Claims, 5 Drawing Figures

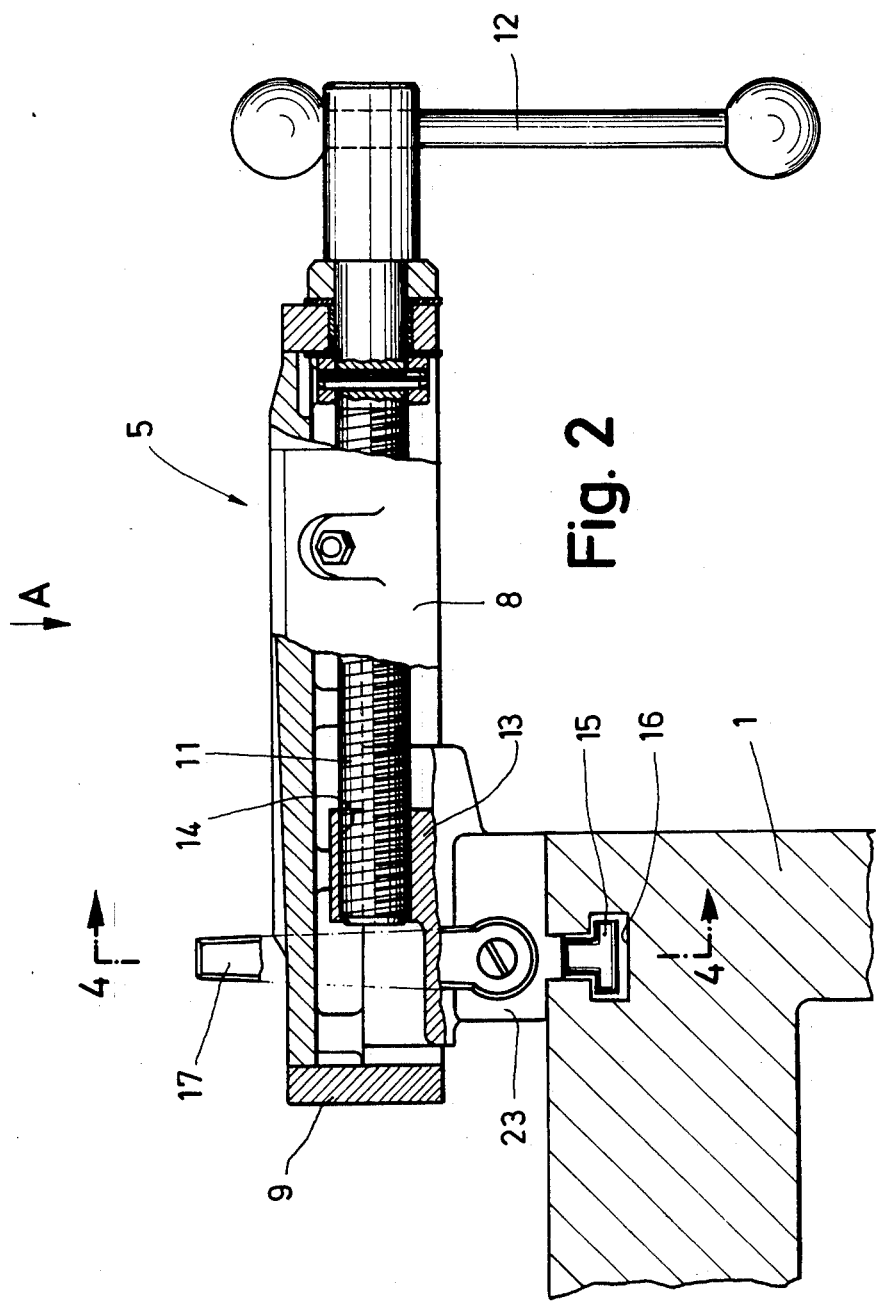

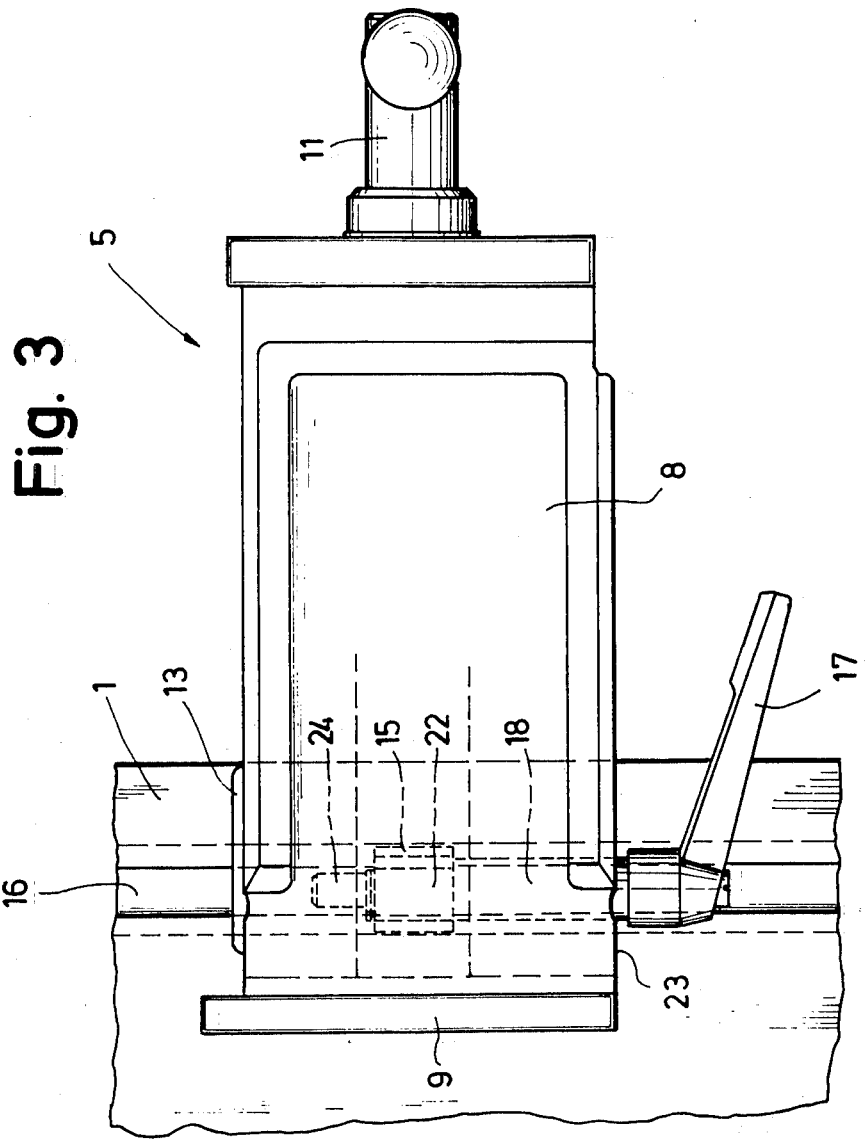

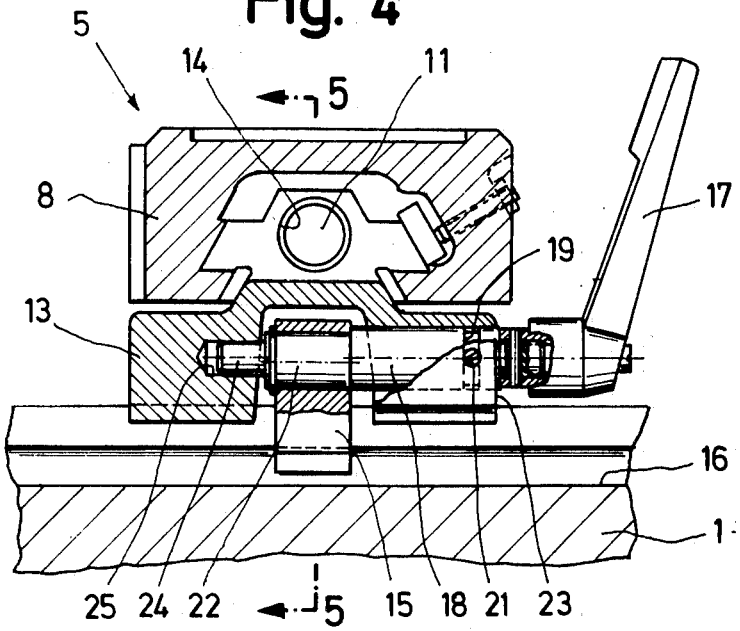
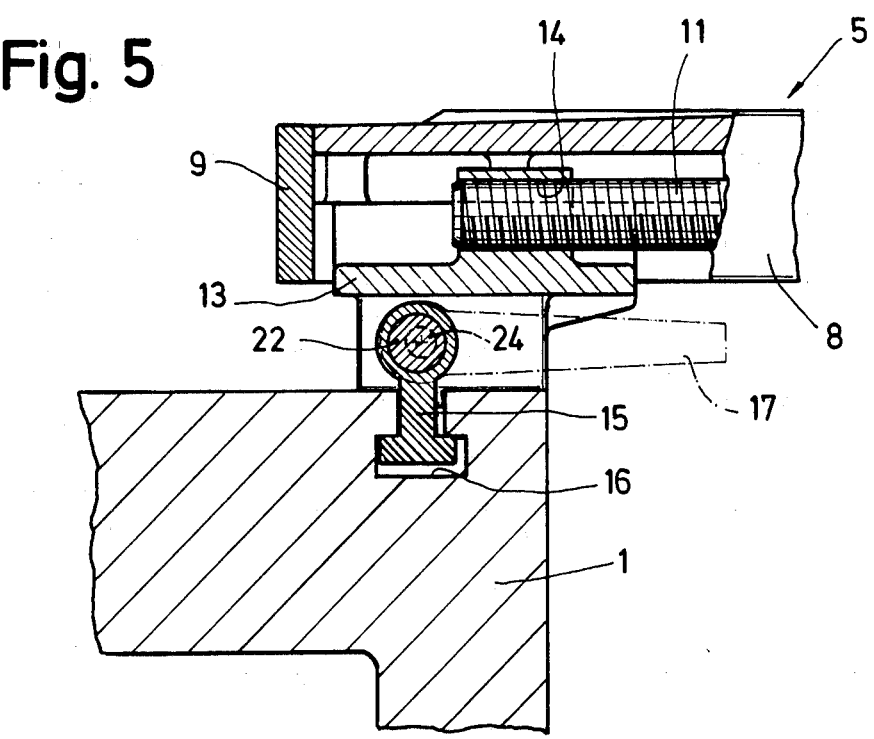

CIRCULAR SAW MACHINE

The invention relates to a circular saw machine comprising a machine frame, a workpiece support, a rotatingly driven circular saw blade as well as a clamping device for clamping workpieces on the workpiece support, the clamping device being displaceable and clampable on the machine frame and relative to the circular saw blade in a shaped groove and by a sliding member engaging in this groove.

With known machines of this type the clamping device has a relatively long sliding member which is clamped in the groove by two clamping screws provided on the stationary part of the clamping device. Since it is often necessary to readjust the clamping device, for example for making miter cuts or longitudinal slots with the sawing machine, it is necessary to release the clamping screws each time, readjust the clamping device and subsequently tighten the clamping screws again. This is a complicated and time-consuming procedure. In addition, at least one of the clamping screws of the known machine is difficult to reach when additional parts, e.g. a second clamping arm, are mounted on one side of the clamping device.

The object of the invention is to obviate these shortcomings and to design a circular saw machine of the type in question such that the clamping device may be quickly and easily adjusted and clamped. The object is accomplished according to the invention in that the sliding member is clampable in the groove by means of an eccentric.

The following description of a preferred embodiment of the invention, together with the attached drawings, serves to explain the invention in more detail. The drawings show:

FIG. 1 a view of a circular saw machine with clamping device;

FIG. 2 a sectional view of the clamping device;

FIG. 3 a plan view in the direction of arrow A in FIG. 2;

FIG. 4 a sectional view along the line 4—4 in FIG. 2 and

FIG. 5 a sectional view along the line 5—5 in FIG. 4.

FIG. 1 shows a substantially schematic illustration of a circular saw machine. This circular saw machine has a machine frame 1, a workpiece support 2, a circular saw blade 4 rotatingly driven by a motor 3 and a clamping device 5 for clamping a workpiece 6 on the workpiece support 2. The circular saw blade 4 is covered in the customary manner by a protective casing 7 and can be moved up and down with the motor 3 in a guide means so that the rotating saw blade 4 makes the required cut in the workpiece 6. With the arrangement illustrated in FIG. 1 the workpiece 6 is sawn at right angles to its longitudinal axis. The saw blade 4 of the illustrated machine may, however, be tilted with its mounting and drive motor 3 such that miter cuts may be made in the workpiece 6 at an angle varying from 90° or slots sawn parallel to its longitudinal axis. In this respect, the saw blade assembly is rotatable about an axis extending perpendicularly to the workpiece support 2 in a manner known per se and therefore not expressly described.

The clamping device 5 (cf. in particular FIG. 2) comprises, in the customary way, a hollow clamping arm 8 with a fence plate 9 engaging on the workpiece 6. A screw spindle 11 is mounted in the interior of the clamping arm 8 so as to be rotatable but not axially displaceable. One end of the screw spindle 11 extends beyond the clamping arm 8 and this end supports the customary, axially displaceable actuating arm 12.

The clamping arm 8 is mounted for sliding displacement on a clamping block 13 in the known way. The end of the screw spindle 11 opposite the arm 12 engages in an internal thread 14 of the clamping block 13. When the screw spindle 11 is turned the clamping arm 8 will be moved relative to the stationary clamping block 13 in order to clamp the workpiece 6 against a part of the machine frame 1 located opposite the fence plate 9.

The clamping block 13 extends into a groove 16 in the machine frame 1 by means of a movably mounted sliding member 15. The groove 16 is designed to be complementary in shape to the cross-sectional profile of this sliding member. Sliding member 15 and groove 16 may, as illustrated, be T-shaped but can also have the customary dovetail shape or a different cross-sectional profile. The sliding member 15 may be displaced (in FIG. 2 upwards) by a clamping lever 17 pivotally mounted on the clamping block 13 so that the sliding member 15 is clamped in the groove 16. In this way, the clamping block 13, which is, as such, displaceable on the machine frame 1, may be locked in the required position.

As shown in particular in FIGS. 4 and 5, the clamping lever 17 is rigidly connected to a shaft 18 rotatably mounted in the clamping block 13. The shaft 18 runs parallel to the groove 16 and is not displaceable in axial direction due to a notch 19 and a screw 21 which engages in this notch and is secured to the clamping block 13. In the area of the sliding member 15 the shaft 18 is constructed as an eccentric disk 22. The axes of shaft 18 and eccentric disk 22 are offset relative to each other as illustrated in FIG. 4 by the dash-dot lines. The sliding member 15, which has a corresponding bore, is rotatably mounted on the eccentric disk 22 (FIG. 5). If the shaft 18, and therewith the eccentric disk 22, is rotated via the clamping lever 17 the sliding member 15 will abut securely against the upper side of groove 16, the clamping block 13 and with it the clamping device 5 thereby being locked in position on the machine frame 1 (FIG. 5). If the clamping lever 17 is turned in the opposite direction the sliding member 15 will be disengaged from the upper side of the groove 16 and the clamping device 5 can then be repositioned and subsequently reclamped.

As illustrated, the clamping lever 17 is arranged on an end surface of the clamping block 13 extending transversely to the groove 16. The opposite end face of the clamping block 13 is free so that additional parts, for example a second clamping arm, may be mounted on it. As shown best in FIG. 4, the shaft 18 bearing the sliding member 15 extends beyond the sliding member 15 in the form of an extension 24 and is rotatably mounted by means of this extension 24 in a corresponding bore 25 of the clamping block 13. The sliding member 15 is therefore supported on two sides by the shaft 18. With another embodiment of the invention the shaft 18 need not be extended beyond the sliding member 15. In this case, the sliding member is then rotatably mounted in a cantilever manner on the part of the eccentric shaft 18 designed as an eccentric disk.

I claim:

1. A circular saw machine comprising a frame, a workpiece support mounted on said frame; a rotatable saw mounted adjacent to said workpiece support; a shaped groove formed in said frame; workpiece clamping means having a lower support portion slidably mounted in, and interfitting with said shaped groove whereby said clamping means is slidably keyed to said frame; means for locking the clamping means support portion in a desired, fixed position along the length of said shaped groove comprising a rotatable shaft having its longitudinal axis extending over and in substantially parallel relation with said groove; said workpiece clamping means also having a bore; said shaft having a first portion rotatably mounted in said bore; a slot formed in the workpiece clamping means portion defining said bore; means engaging said shaft first portion and disposed in said slot for preventing axial movement of said shaft in both directions relative to said workpiece clamping means; a second portion of said shaft being formed so as to define an eccentric cylindrical surface of smaller diameter than the diameter of said shaft first portion and which rotates eccentrically relative to the shaft central longitudinal axis; said clamping means lower support portion being connected to the eccentric surface of said shaft whereby rotation of said shaft locks said support portion relative to the portion of said shaped groove in which disposed.

2. The circular saw machine of claim 1 in which said rotatable shaft has a terminal portion of lesser diameter than said first and second shaft portions; said first and terminal shaft portions being mounted in spaced bearings disposed in said clamping means and disposed on opposed sides of said lower support portion.

* * * * *